United States Patent [19]

Kaufhold

[11] 4,164,013
[45] Aug. 7, 1979

[54] SIX-PULSE RECTIFIER CIRCUIT

[75] Inventor: Wolfgang Kaufhold, Erlangen, Fed. Rep. of Germany

[73] Assignee: Siemens Aktiengesellschaft, Munich, Fed. Rep. of Germany

[21] Appl. No.: 860,967

[22] Filed: Dec. 15, 1977

[30] Foreign Application Priority Data

Dec. 30, 1976 [DE] Fed. Rep. of Germany ....... 2659564

[51] Int. Cl.² ........................................... H02M 1/12
[52] U.S. Cl. ................................................. 363/45
[58] Field of Search ..................... 363/39, 44, 45, 125, 363/126, 129

[56] References Cited

U.S. PATENT DOCUMENTS 3,867,684   2/1975   Ginsberg et al. ...................... 363/80

Primary Examiner—J. D. Miller
Assistant Examiner—Peter S. Wong
Attorney, Agent, or Firm—Kenyon & Kenyon

[57] ABSTRACT

A six-pulse rectifier circuit includes a rectifier bridge, with six valves, arranged in the secondary circuit of a three phase transformer having an increased internal resistance and shunted by a load resistor arrangement for sensing the actual value voltage for use in a fast control device with the resistance of the load resistor arrangement matched to the increased internal resistance of the transformer, so that at least three but no more than four of the six valves are always commutating.

1 Claim, 2 Drawing Figures

SIX-PULSE RECTIFIER CIRCUIT

BACKGROUND OF THE INVENTION

This invention relates to rectifiers in general and more particularly to an improved six pulse rectifier circuit.

In known rectifier circuits having a rectifier bridge arranged in the secondary circuit of the three phase transformer and shunted by a load resistor arrangement for sensing the actual value voltage for a fast control device, particularly for static phase shifters, stability perturbations can occur which are caused to the ripple of the rectified voltage. These perturbations make applications to fast control devices problematic. To circumvent these stability perturbations, the ripple of the rectified voltage must be reduced by higher pulse rectifier circuits which, however, requires correspondingly higher expenditures for transformers, diodes and other circuit components.

SUMMARY OF THE INVENTION

It is an object of the present invention to improve a six pole rectifier circuit in such a manner that it has the lower ripple of a higher pulse rectifier circuit without the extra expenditure for circuit components.

According to the invention, the stated problem is solved by using a transformer with an increased internal resistance and matching the resistance of the load resistor arrangement to the internal resistance of the transformer, so that at least three, but no more than four of the total of six valves of the rectifier bridge are always commutating.

The present invention utilizes the commutation breaks in the secondary a-c voltage of the transformer having a suitably high internal resistance. The secondary a-c voltage of the transformer thereby acquires an approximately trapezoidal waveform which, when rectified, approximately exhibits the ripple of a 12-pulse rectifier circuit. Additional smoothing means are not necessary. The effect of the invention is based on a lengthening of the commutation time and the participation of the mentioned number of valves in the commutation process, causing a corresponding flattening of the amplitudes of the secondary a-c voltage.

DETAILED DESCRIPTION OF THE INVENTION

Figure 1:
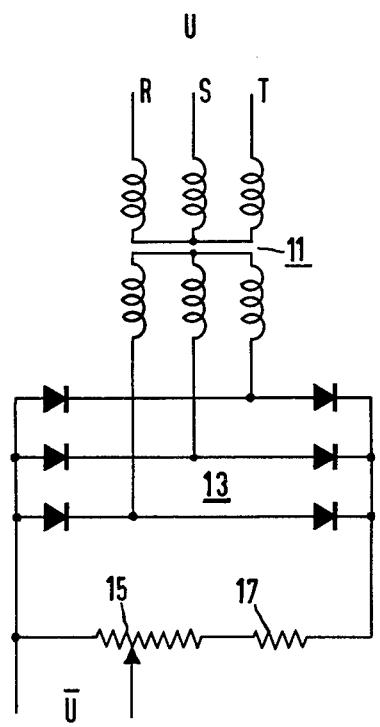
FIG. 1 is a simplified schematic of the rectifier circuit of the present invention.
Figure 2:
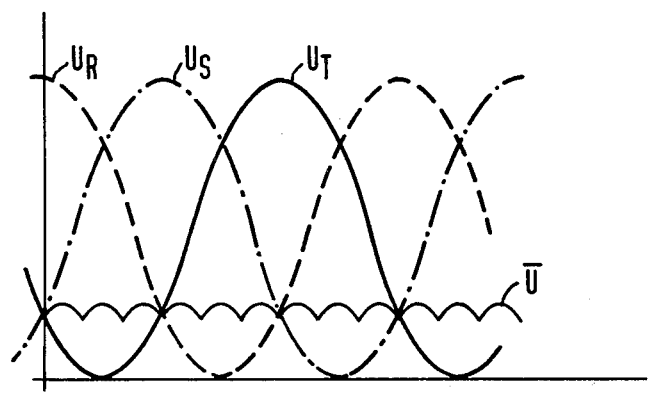
FIG. 2 illustrates the waveform of the phase voltages of the line and the rectified secondary voltage of the transformer.

A transformer 11 with a customary winding arrangement is shown on FIG. 1. Transformer 11 has an increased internal resistance through the use of many turns of thin conductors and is loaded on the secondary side, via the rectifier bridge 13, by the load resistor arrangement formed by the series connected resistors 15 and 17, the total resistance of which is chosen to be approximately equal to the internal resistance of the transformer. It should be noted here that with decreasing resistance, the flattening of the secondary voltage of the transformer increases. Instead of the customary, approximately sinusoidal secondary a-c voltage, an approximately trapezoidal secondary a-c voltage is obtained thereby, which is rectified by the six-pulse rectifier bridge 13. The remaining ripple of the rectified secondary voltage U is less than that of a rectified sinusoidal a-c voltage.

In a control circuit equipped with the rectifier circuit according to the present invention, its loop gain remains unchanged.

What is claimed is:

1. In a six pulse rectifier circuit, having a rectifier bridge with six valves arranged in the secondary circuit of a three phase transformer and shunted by a load resistor arrangement for sensing the actual voltage value for a fast control device, the improvement comprising the internal resistance of the transformer being increased to the extent that the transformer produces a three phase output in the secondary circuit having wave forms with a trapezoidal shape, and the resistance of the load resistor arrangement matched to the internal resistance of the transformer, such that at least three, but no more than four of the total six valves of the rectifier bridge are always commutating.

* * * * *